United States Patent [19]

Bartholow et al.

[11] Patent Number: 5,600,348
[45] Date of Patent: Feb. 4, 1997

[54] ADJUSTABLE TIP LIGHT PEN

[75] Inventors: Paul A. Bartholow, St. Louis Park; Douglas E. Loebertmann, Shakopee, both of Minn.

[73] Assignee: FTG Data Systems, Stanton, Calif.

[21] Appl. No.: 292,867

[22] Filed: Aug. 19, 1994

[51] Int. Cl.$^6$ ................................................ G09G 1/00
[52] U.S. Cl. ........................ 345/180; 345/179; 345/181; 345/182; 345/183; 345/184
[58] Field of Search ................................ 345/179, 180, 345/181, 182, 183, 184; 401/256, 233, 221, 278

[56] References Cited

U.S. PATENT DOCUMENTS

| Re. 34,187 | 3/1993 | Yamanami et al. | 345/179 |
|---|---|---|---|
| 1,493,681 | 5/1924 | Koepsell | 401/221 |
| 3,528,295 | 9/1970 | Johnson et al. | |
| 4,104,603 | 8/1978 | Wheeler et al. | 335/306 |
| 4,642,459 | 2/1987 | Caswell et al. | 345/180 |
| 4,677,428 | 6/1987 | Bartholow | 340/708 |
| 5,007,757 | 4/1991 | Iizuka | 401/278 |

FOREIGN PATENT DOCUMENTS

| 7060479 | 4/1982 | Japan | 345/179 |

Primary Examiner—Richard Hjerpe
Assistant Examiner—Juliana S. Kim
Attorney, Agent, or Firm—Schwegman, Lundberg, Woessner & Kluth, P.A.

[57] ABSTRACT

A light pen for use in data imput to data processing equipment, has an adjustable tip assembly wherein the tip switch sensitivity and tactile feel or feedback to the user can be varied according to user preferences and particular applications. In one mode, the pen can be set for a normal, longer throw of the switch, so as to provide and require a definite touch or push action on the part of the user in order to actuate the switch. In another mode, the tip switch characteristics can be adjusted for a very light feel, so as to permit delicate input such as handwriting or drawing. The tip assembly includes an adjustable stop member provided within the tip housing, to provide a variable limit for the travel of the tip structure. In a preferred form, the adjustment includes contact surfaces on said tip structure and said stop member, at least one of which includes and annular shape lying in a plane which is inclined at an angle to perpendicular with respect to the axis of the light pen, so that varying the rotational position of the tip structure and stop member changes the effective length of travel and sensitivity of the light pen actuation.

5 Claims, 7 Drawing Sheets

ADJUSTABLE TIP LIGHT PEN

FIELD OF THE INVENTION

The invention pertains generally to the field of light pens for use as input devices for computers. In particular, the invention pertains to an improved adjustable tip light pen.

BACKGROUND OF THE PRIOR ART

Light pens have achieved wide acceptance as data input devices for computers in many application fields. Light pens operate by detecting the scan spot on a raster scanned cathode my tube display, as it is held in place by the user at a desired location on the display and its switch is activated by the user. From this location information, system and application software can make use of the operator's light pen input for numerous tasks such as menu or mode selection, and some graphic manipulations. The direct relationship between a light pen and a CRT image provides advantages in user effectiveness over more indirect pointing devices such as a mouse or keyboard cursor controls. Usually the activation switch is incorporated into the tip of the light pen, so that pushing the pen against the screen activates the select switch, and the travel or resistance of the tip movement provides tactile feedback to the user.

Although prior art light pens have been successful for their intended task such as menu and mode selections and the like, they have generally not been a suitable input medium for tasks requiting a light touch and delicate control, such as handwriting or direct drawing input. The reason for this has been the characteristics of the tip switch used on light pens. Typically the throw, i.e. the length of travel, of the tip switch, in combination with the return spring force, renders the pen somewhat awkward and unnatural to use for things such as handwriting. Most users are accustomed during handwriting to the very light touch afforded by a pen or pencil on paper, and the slightly harder push to keep the light pen switch actuated interferes with the natural feel and, hence, the accuracy and user acceptability of using such devices for handwriting input, or detail drawing input. However, the increasing use of graphic interfaces, and the increasing acceptance and sophistication of draw and computer-aided design types of programs make it desirable to provide a more convenient way for a use to use a light pen for such tasks.

However, a simple attempt to decrease the tip switch travel or spring resistance leads to difficulties which must be overcome. One difficulty is that a very sensitive light pen, such as might be useful for handwriting input, can become too sensitive for other types of uses such as menu or mode selection functions. When operating in that manner, a user may inadvertently touch the tip or drag it along the CRT screen while moving between locations of intended input actuation, and with a very sensitive tip, this may cause false or unwanted triggering inputs. Since, by definition, the resistance or travel of the tip switch has been greatly reduced in order to make handwriting feel natural, there would hardly be any tactile feedback remaining for the user to feel when he or she is making an intended switch actuation-input. It would therefore be necessary to exaggerate the steps of lifting and touching the pen in order to avoid the unwanted triggering. It is believed that users would find this annoying and unacceptable. Another set of problems to be overcome in designing a light pen tip switch usable for handwriting or drawing input is that the very small travel involved makes it difficult to ensure positive and reliable switching. Mechanical switches are ruled out, and even magnetic and opto-electrical switches can have difficulty in distinguishing slight movements of only 5 to 10 thousandths of an inch, particularly in an environment in which the pen and the switch must be very rugged to withstand anticipated shocks such as will be caused by dropping the pen.

SUMMARY OF THE INVENTION

To overcome these and other problems, the present invention provides an adjustable tip light pen for use in data input to data processing equipment, wherein the tip switch characteristics and, hence, the tactile feel or feedback to the user, can be varied according to need. In one mode, the pen can be set for a normal, longer throw of the switch, so as to provide and require a definite touch or push action on the part of the user in order to actuate the switch. This is useful for data input. In another mode, the switch characteristics can be adjusted for a very light, almost unnoticeable feel, so as to permit delicate input such as handwriting or drawing, without interfering with normal hand movement for those activities by requiring extra pressure to hold a switch.

According to one embodiment of the invention, the sensitivity of the switch can be set to normal or light at the time of assembly, for a light pen which will be intended for particular uses or applications. According to another embodiment of the invention, the sensitivity of the tip is continuously adjustable by the user to suit the users preference for the intended application at the moment.

In a preferred embodiment, the light pen includes a pen-like housing for holding by a user, a pen tip structure disposed to be carried at the forward end of the light pen for contacting with the surface of a screen of the data processing equipment. Means are provided for mounting the tip structure for relative movement within the housing as the light pen is pushed in contact with a surface. Electrical switching means mounted within said housing operate to provide a switch function in response to tip movement. A stop member is provided within the housing for contact by the tip structure as the light pen is pushed into contact with a surface, to limit the travel of the tip structure. Also included is adjustment means for selectively adjusting the effective distance between the stop member and tip structure so as to control the length of tip travel during user-activated contact with a surface to initiate the switch function of the light pen. In a preferred form, the adjustment means includes means defining contact surfaces on said tip structure and said stop member, at least one of which includes a circular or annular shape lying in a plane which is inclined at an angle to the perpendicular with respect to the axis of the light pen, and means are provided for varying the relative rotational position of the tip structure and stop member, thereby to change the effective length of travel and sensitivity of the light pen actuation.

DETAILED DESCRIPTION OF THE PREFERRED EMBODIMENT

Figure 1:
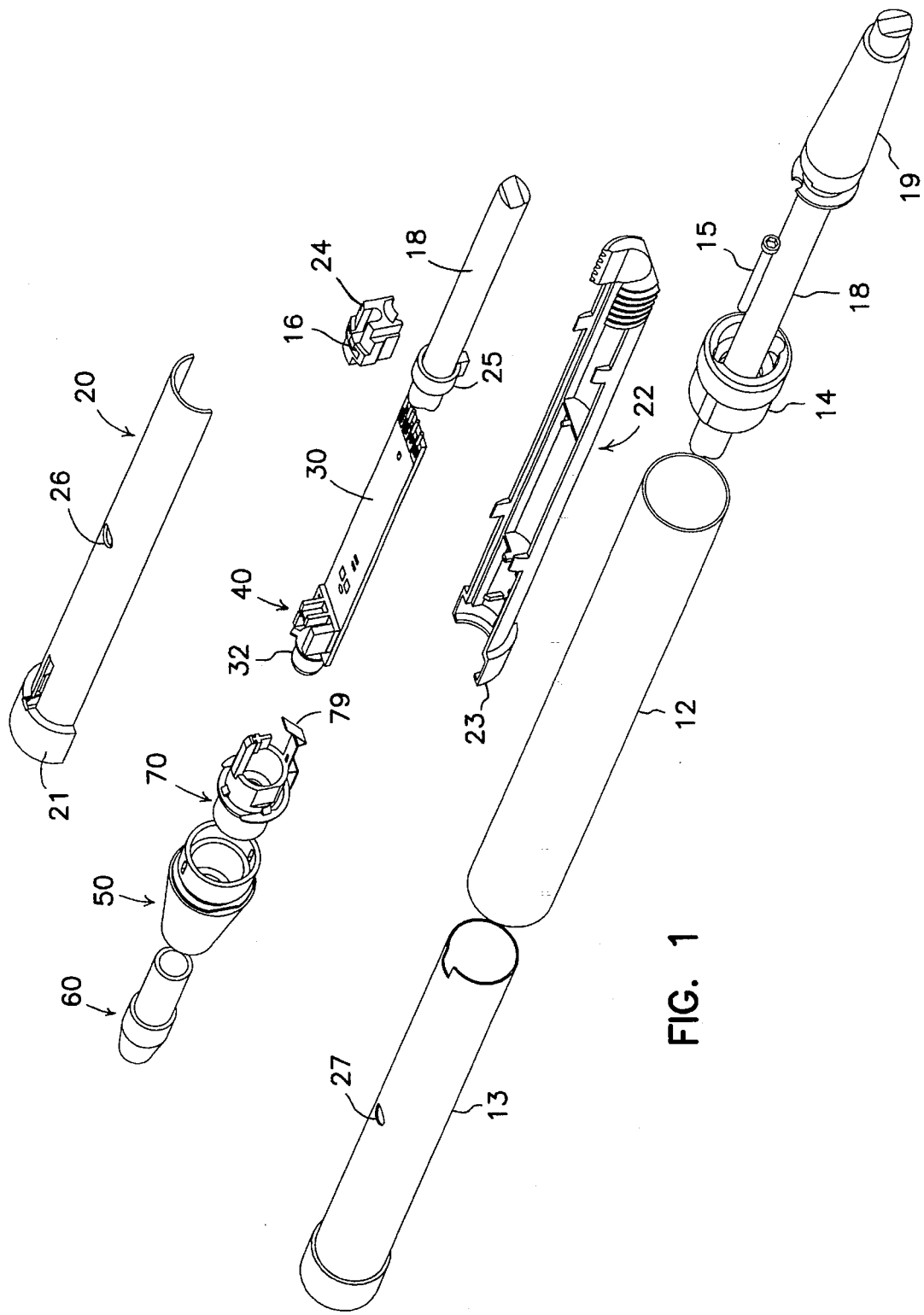
FIG. 1 is an exploded view of a light pen utilizing the adjustable tip feature according to the present invention.

With reference to FIG. 1, the light pen includes an outer housing or tube 12, which is a rigid cylindrical shape forming the exterior of the light pen. Housing 12 is preferably relatively narrow, consistent with the space requirements for the electronics and other interior components, as it is the portion to be held by the user in the use of the device. Inside tube 12 is an inner shield tubular member 13. This is made of metal, or coated with metal, and is grounded to the circuitry to act as an electromagnetic shield to protect the circuitry housed in the interior of the light pen from adverse effects of electrostatic fields in the environment in which it may be used. End cap 14 fits within the back end of housing 12, and has an opening therein to receive cable 18. A strain relief 19 for cable 18 also attaches into end cap 14. The cable is, of course, for connection to a suitable input on the computer or data processing system (not shown) with which the light pen is to be used. A small bolt 15 passes through end cap 14 and engages a captive nut in retainer 24.

The electronic circuitry for the light pen is contained on a small circuit board 30. This includes circuitry for the photosensor 32, mounted at the extreme forward end, which senses the scanning spot on the CRT. As used herein the term "front" or "forward" refers to a direction to the tip of the light pen, while the term "rearward" or "back" refers to a direction towards the cable end. Circuit board 30 also holds the optical switching for the tip actuation, which includes switch assembly 40, mounted at the forward end of circuit board 30. The details of the circuitry for the light pen are not shown, as such techniques are generally known, and do not specifically form a part of the present invention, which is related to the user tip actuation switch mechanism. In assembly, circuit board 30 is held in place between frame top 20 and frame bottom 22, where it is supported by suitable pins and flanges formed therein. Retainer 24 fits over cable 18 and is held in place in frame bottom 22. A strain collar 25 on the cable abuts retainer 24 and prevents damage to the cable or electronics due to pulling on the cable. As previously mentioned, retainer 24 includes a captive nut 16 which is engaged by bolt 15 to hold the assembly together. An access hole 26 is provided in frame top 20, which lines up with a corresponding access hole 27 in inner shield tube 13 to permit a small screwdriver adjustment of sensitivity controls on the circuit board during manufacture and testing.

Figure 2:
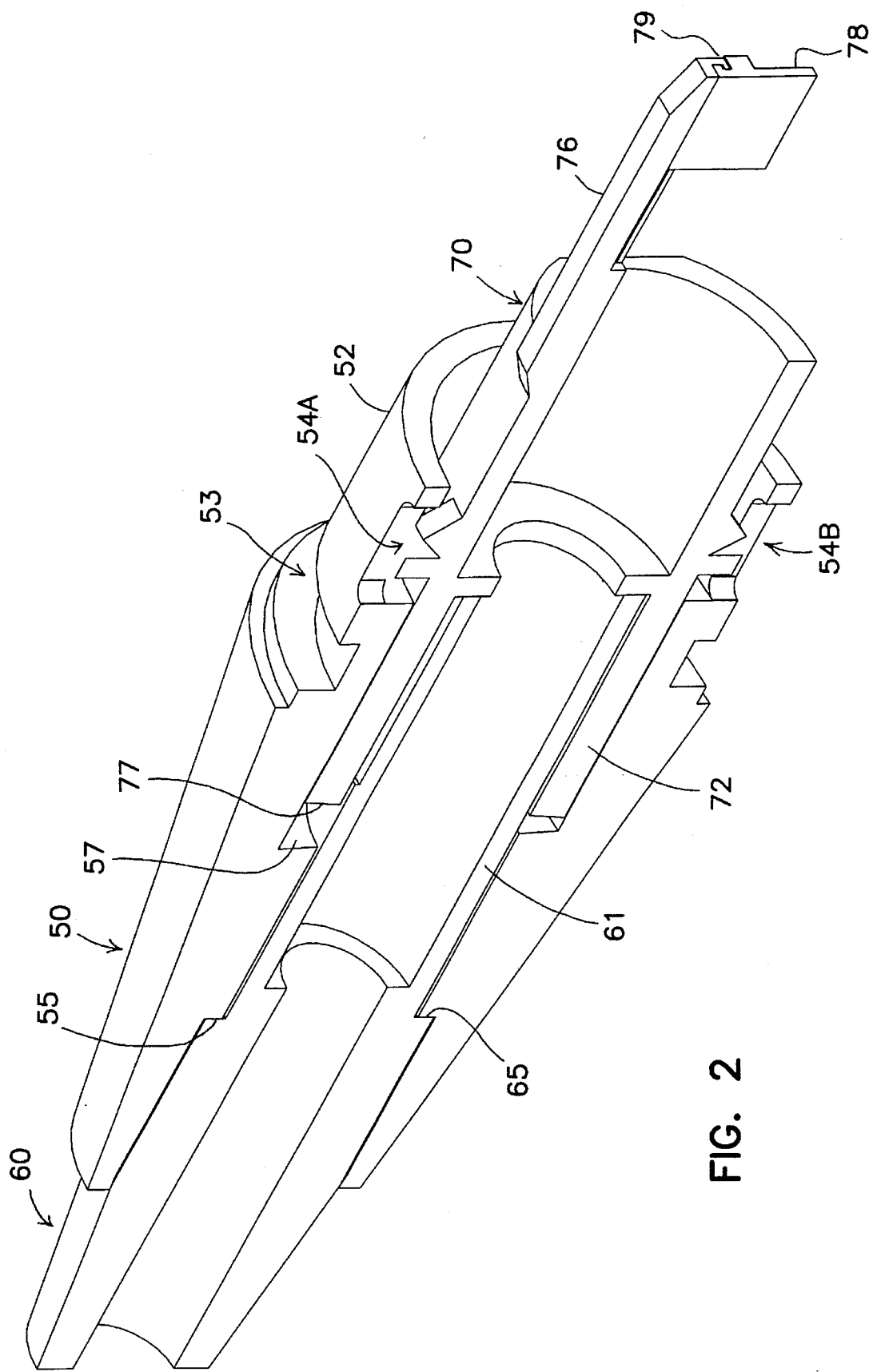
FIG. 2 is an oblique sectional view, at an enlarged scale, of the tip assembly of the light pen of FIG. 1.
Figure 3A:
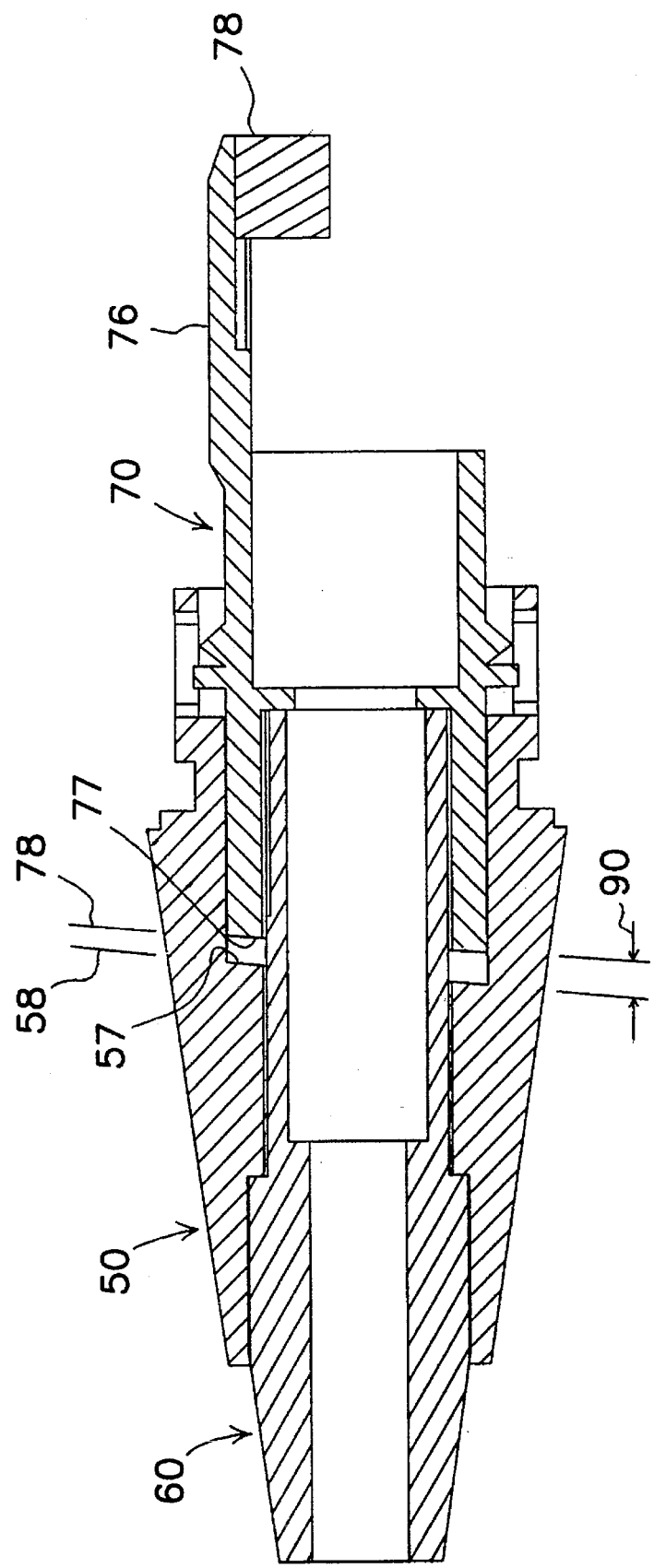
FIG. 3A is a sectional view of the adjustable tip assembly set for a long throw position.
Figure 3B:
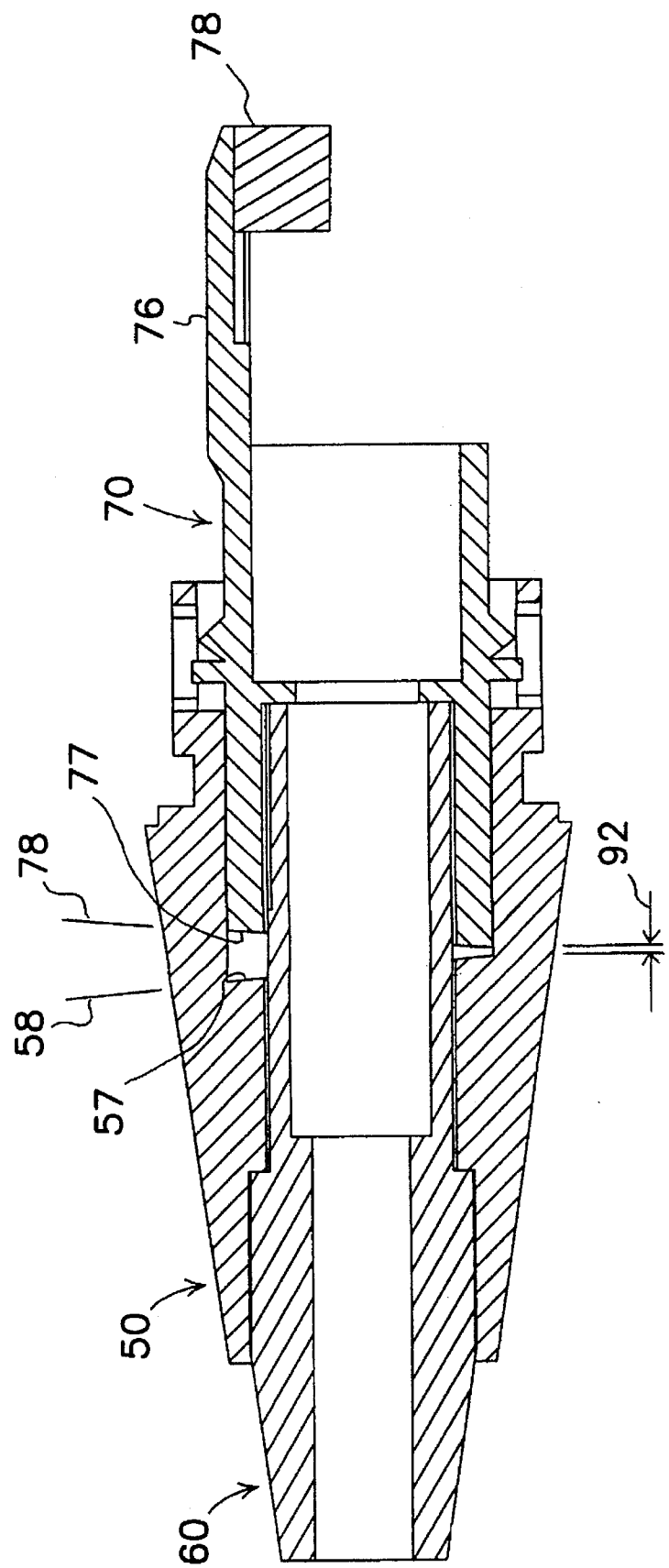
FIG. 3B is a view similar to FIG. 1, with the tip assembly set for a short throw operation.

The tip assembly includes tip housing 50, optical tip housing 60, and optical base 70. As will be explained below, in assembly, optical tip housing 60 and optical base 70 are fit together and movably received within tip housing 50, to move as one unit. Tip housing 50 is held in place by the top and bottom frame halves 20, 22. Specifically, frame top 20 has a collar portion 21 at its forward end, and frame bottom 22 has a similar collar portion 23 at its forward end. As seen in FIGS. 2 and 3A–3B, the tip housing 50 has a corresponding collar portion 52, defined between a groove 53 and the rearward edge of the tip housing. In assembly, collars 21 and 23 fit over collar 52 with forward flanges thereof in groove 53, thereby holding tip housing 50 in place with respect to the frames and the light pen as a whole.

Optical tip housing 60 and optical base 70 fit through a central aperture of tip housing 50 and are press fit into each other so that optical tip housing 60 and optical base 70 form a single unit which is axially slidably moveable within tip housing 50. A spring, which in the preferred embodiment is a helical compression spring, is mounted between a back side mounting flange on optical base 70 and the frame tip 20 and frame bottom 22, to normally bias the tip towards its outward, or unactuated position. For purposes of clarity of illustration, the spring is not shown in the Figures. During contact with the surface, optical tip housing 60 and optical base 70 will move inwardly against this spring bias to actuate the switch as explained below.

Tip housing 50 is molded from nylon or other suitable material, and has a tapered external shape and the previously mentioned groove 53 and collar 52 for attachment. It also has a central aperture for receiving the optical tip housing 60 from its forward end, and optical base 70 from its rearward end. As can also be seen in FIG. 2, the internal aperture of tip housing 50 has annular steps or rings formed therein, which form stop abutment limit surfaces for the operation of the tip switch. This includes a forward facing in limit surface 55, and a rearward facing out limit surface 57.

Optical tip housing 60 is preferably made of molded Delrin, a material chosen so as not to mar or damage the surface of CRTs with which the light pen will be used. It has a rearward facing surface 65 which abuts surface 55 of the tip housing to jointly define the maximum inward limit of travel of optical tip housing 60 when the user is pushing the light pen against the surface.

Optical tip housing 60 has a rearward cylindrical portion 61, and a central aperture which extends therethrough. The rearward cylindrical portion 61 is received within a forward portion 72 of optical base 70. The two pieces are press fit together so as to be captive within tip housing 50, but axially slidable therein between limits. The forward end of optical base 70 has a surface 77, referred to as the out limit surface 77. This cooperates with the out limit surface 57, previously described, of tip housing 50 to limit the amount of travel of the tip. Optical base 70 is preferably molded from nylon or similar material, and has a conductive coating applied thereto to serve as a grounded shield for the photosensor 32, which, in assembly, nests within the rearward opening recess ground connection for this shield is conveyed via a clip 79 which contacts a ground strip (not shown) on circuit 30.

Figure 4:
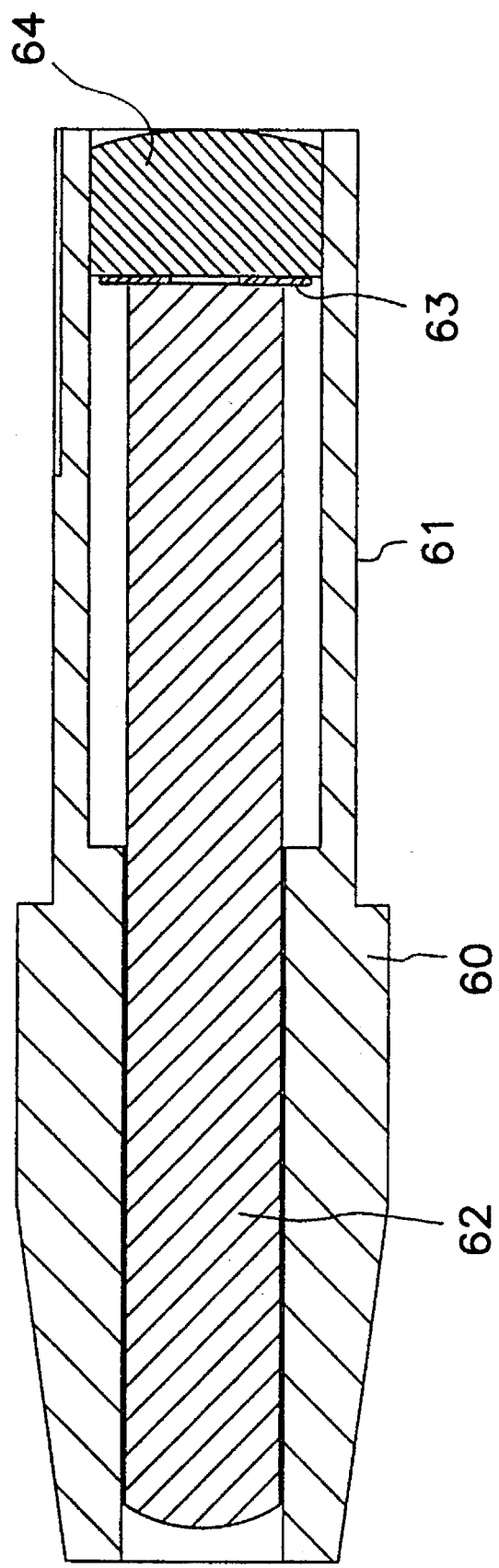
FIG. 4 is sectional view of the optical tip housing showing a lens assembly.

As seen in FIG. 4, a lens assembly is also mounted within the central aperture of optical tip housing 60. This includes an acrylic cylindrical member 62 sized to essentially fill the interior, with its forward end rounded and recessed slightly for protection against scratches and the like. At its rearward end, an aperture piece, which is a flat annular disk 63, is mounted and the end is filled with epoxy 64 forming a meniscus curvature to complete the optical assembly. In full assembly, this optical element conducts light from the screen in front of the tip through to the photosensor 32 where it is detected. It has been found preferable to apply antireflection techniques, in the form of a series of circumferential grooves the outer surface of the rod, roughening the surface of the non-grooved portions, and applying a dark coating on the exterior of the rod.

Figure 5:
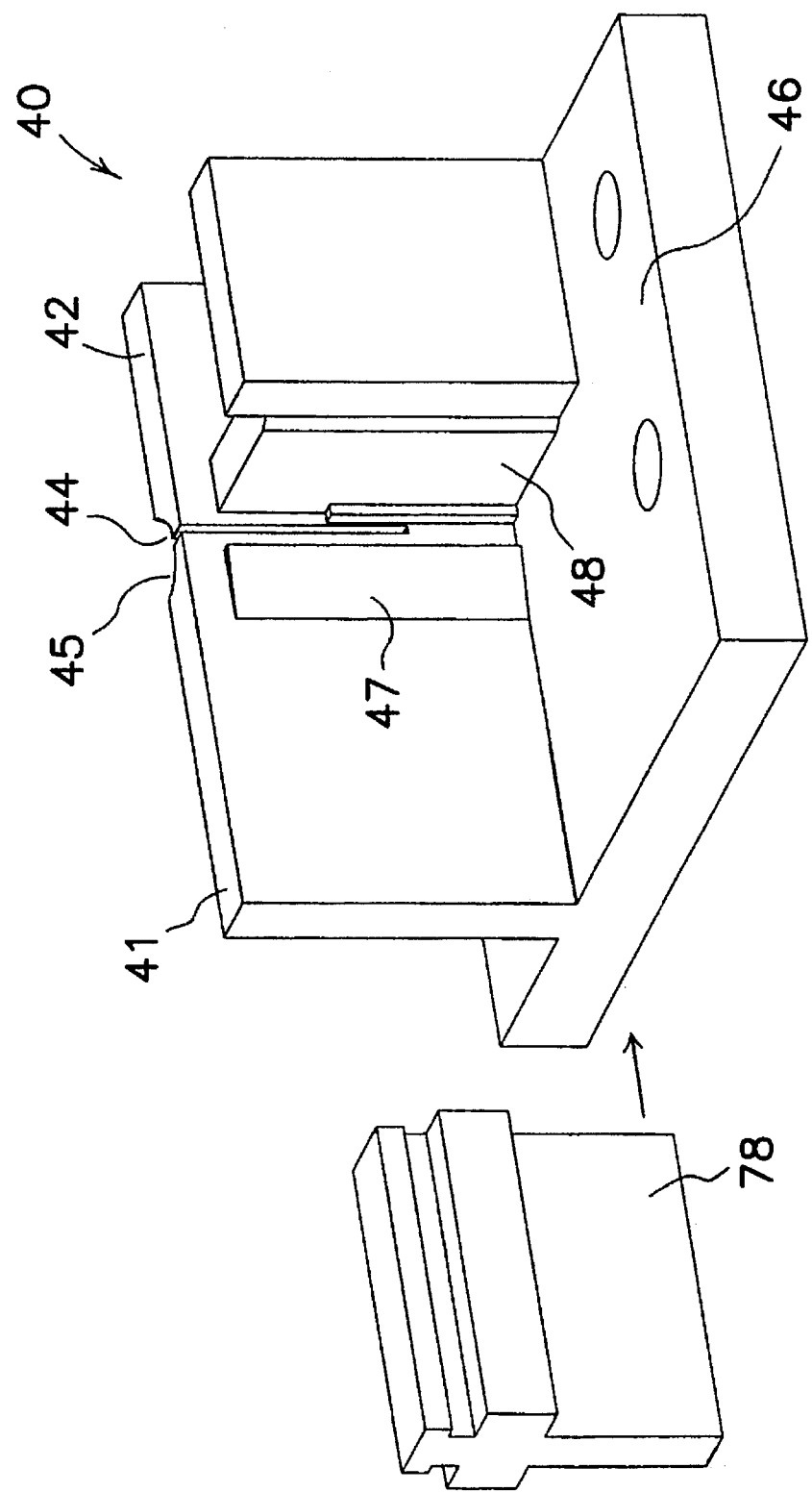
FIG. 5 is an oblique at an enlarged detail of the switching assembly of the light pen of FIG. 1.

At the rearward end of optical base 70, an extension 76 extends rearwardly. It carries an interrupter blade 78, which is a small nylon plate. Interrupter blade 78 is secured to extension 76 by a system of interlocking grooves indicated at reference number 79, and is press fit into place. Additionally, it may be glued, if desired. In assembly, extension 76 extends over and behind photosensor 32, and interrupter blade 78 cooperates with the aperture block of the switch assembly 40. This is seen in FIGS. 1 and 5. Assembly 40 has a pair of wall members 41, 42 aligned with the axially direction of the light pen, and specifically with the axial direction of interrupter blade 78. A narrow aperture slit 44 is formed therein. In order to keep the dimensions small, material on the side indicated that reference number 45 is narrowed through an arc. The ramps and support members 47 and 48 are provided to add strength and thickness (for opacity) and are ramped or beveled to avoid interference with the interrupter blade. The actuation switch uses electro-optics, with an LED on one side of aperture 44, and a photodetector on the other side. Aperture 44 is held to very small dimensions, typically 0.005 to 0.007 inch. Interrupter blade 78 moves in the direction shown by the arrow when the tip switch is actuated, causing the light path through aperture 44 from LED to censor to blocked. Note that FIG. 5 is drawn with interrupter blade 78 well off to the side for purposes of illustration, but that in use in assembly, interrupter blade 78 overlays member 47 just short of the position of light through aperture slit 44. In that manner, when the optical tip housing 60 is moved a slight amount, the interrupter blade 78 will break the light beam, which will be detected by the electronics (not shown) as is generally known, to provided the appropriate output on the electronic cable.

FIG. 3A shows the tip adjusted m its long throw, or normal sensitivity position; FIG. 3B shows the tip adjusted to its short throw, or high sensitivity position. Both FIGS. 3A and 3B show the tip in the depressed, or actuated, position, with travel limited by the contact of in limit surfaces 55 and 65. As seen in FIGS. 2, 3A and 3B, note that out limit surface 57 is generally a portion of a circular or annular surface, lying in a plane which is inclined at an angle from the perpendicular with respect to the longitudinal axis of the light pen. Ibis plane is indicated by reference number 58 in FIG. 3A and 3B. Similarly, the out limit surface 77 at the forward end of optical base 70 also defines a circular or annular surface lying in a plane, indicated by reference number 78. This plane is also inclined at an angle from the perpendicular with respect to the longitudinal axis of the light pen.

In the configuration of FIG. 3A, tip housing 50 has been rotated to where planes 58 and 78 essentially align with one another. In this position, there is a relatively larger gap or space indicated by dimension 90, through which the tip can move on the return stroke at the end of an actuation and, of course, more significantly to the user, it is the distance through which the tip will move during an actuation.

In the configuration of FIG. 3B, tip housing 50 has been rotated approximately 180 degrees to where the planes 58 and 78 are at a maximum of divergence with respect to each other. This means that the point of potential contact of out limit surfaces 57 and 77 will occur at the bottom of orientation of FIG. 3B and, more importantly, that the permitted distance of travel is now reduced to the smaller dimension indicated by reference number 92. Thus, in FIG. 3B, reference number 92 represents the shorter travel or throw of the tip in the high sensitivity position.

Since tip housing 50 is held by annular collars and grooves in frame 20, 22 as previously described, it can be rotated through the various sensitivity positions. By rotation tip housing 50, the amount of permitted travel and, hence, the sensitivity of the tip, can be adjusted between high and low values indicated by references 90 and 92, and also through intermediate values. Preferably, tip housing is held tight enough to frictionally retain the position in which it is set but loosely enough so that the user can adjust it conveniently. It is important to note that the amount of sensitivity is actually adjusted from the return stroke, i.e., at the out limit rather than at the in limit. This makes it easier to ensure that the positioning and sensitivity of interrupter blade 78 in the electro-optic switch assembly 40 is unchanged.

Figure 6:
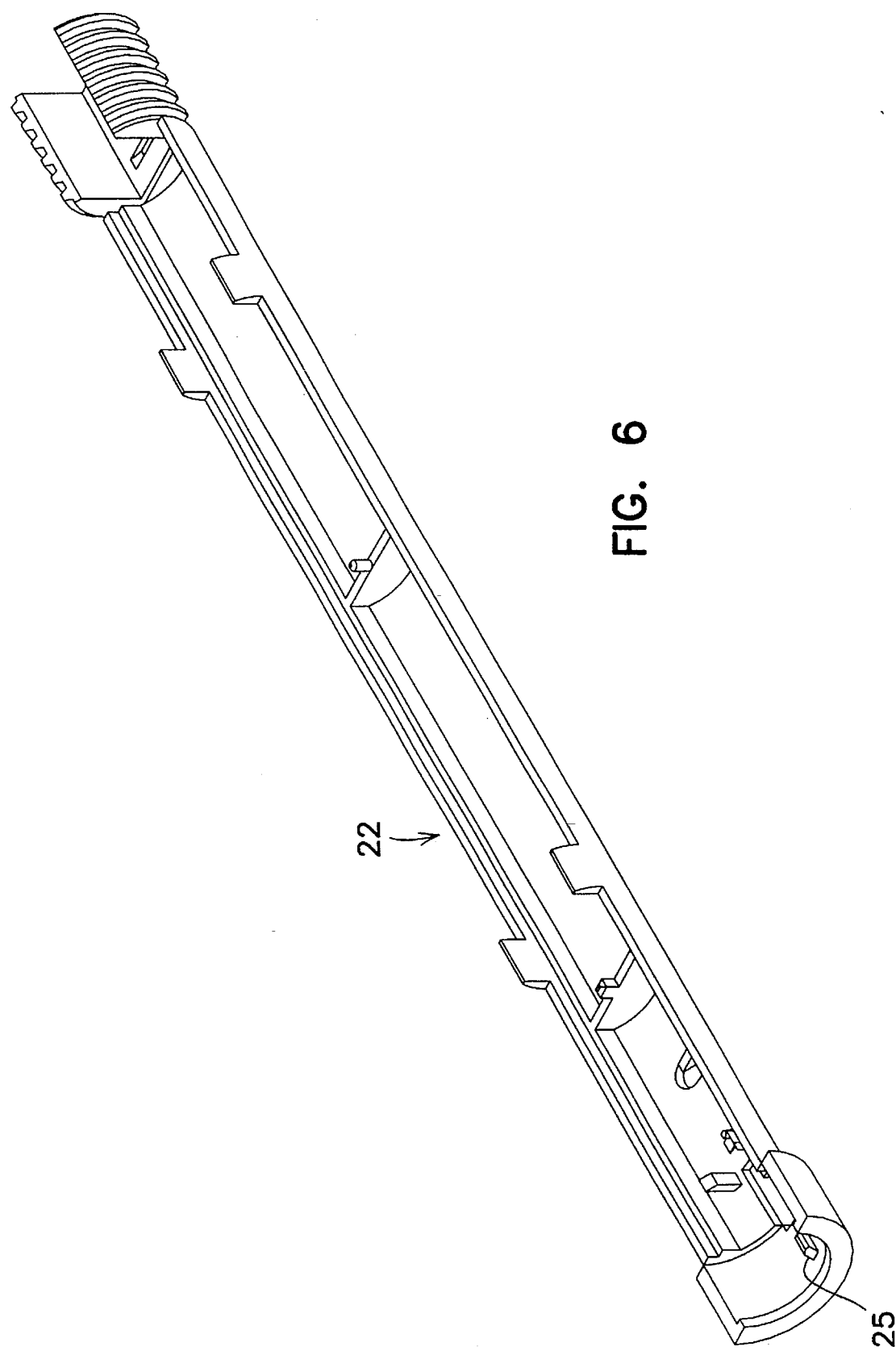
FIG. 6 is an oblique view of the frame bottom portion of the pen assembly of FIG. 1, at an enlarged scale to illustrate certain details therein.

Alternatively, it may be desirable for some applications to set the tip only for a single sensitivity position. This would be appropriate, for example, where a certain production run of pens were only to be used for a given dedicated purpose. In that case, a small locating tab 25, as seen in FIG. 6, can be placed in the collar portion 23 of frame bottom 22. Optionally, a similar tab can be provided in the collar 21 on frame top 20. These cooperate with slots or recesses formed in collar 52 of tip housing 50, as seen in FIG. 2.

Specifically, recesses 54A and 54B are diametrically opposed to each other. When tip housing 50 is rotated so that recess 54B aligns tab 25 in the frame bottom of 22, the tip assembly will be set to the short throw, high sensitivity position, as shown in FIG. 2. Alternatively, when, during assembly, tip housing 50 is rotated 180 degrees to place recess 54A over tab 25, then the tip assembly will be held in a dedicated normal or long throw position.

Based on the foregoing description, it will be seen that the present invention provides an improved light pen assembly having an adjustable sensitivity tip, permitting optimum adjustment of the sensitivity, throw and tactile feel of the pen, to accommodate different intended uses and user preferences.

We claim:
1. A light pen for use in data input to data processing equipment, comprising:
 a pen-like housing for holding by a user;
 a pen tip structure disposed to be carried at the forward end of the light pen for contacting with the surface of a screen of the data processing equipment;
 means for mounting the tip structure for relative movement with the housing as the light pen is pushed in contact with a surface;
 electrical switching means mounted within said housing and operative to provide a switch function in response to said tip movement;
 a stop member within said housing for contact by said tip structure as the light pen is pushed into contact with a surface, to limit the travel of the tip structure; and
 adjustment means for selectively adjusting the effective distance between the stop member and tip structure so as to control the length of tip travel during user-activated contact with a surface to initiate the switch function of the light pen.
2. A light pen according to claim 1 wherein said adjustment means includes means defining contact surfaces on said tip structure and said stop member, at least one of which includes a circular shape lying in a plane which is inclined at an angle from perpendicular to the axis of the light pen, and includes means for varying the relative rotational posi- tion of said tip structure and stop member, thereby to change the effective length of travel.

3. A light pen according to claim 2 wherein both the tip structure and stop members have circular shaped surfaces positioned to contact one another to limit travel, wherein both said circular shaped surfaces are in planes inclined at an angle from perpendicular to the longitudinal axis of the light pen, and wherein relative rotational movement between the tip structure and stop member changes the points of limit contact thereof and the amount of permitted travel.

4. A light pen according to claim 2 wherein said adjustment means is configured for user selectable adjustment by rotation of the adjustment means externally of the light pen.

5. A light pen according to claim 2 wherein said adjustment means is configured for selectable adjustment by rotation of the adjustment means prior to assembly the light pen, and wherein said adjustment means is held to prevent rotational adjustment after the light pen is assembled.

* * * * *